United States Patent
Huang et al.

(10) Patent No.: US 6,233,061 B1
(45) Date of Patent: May 15, 2001

(54) INK REDUCTION DEVICE AND METHOD FOR A COLOR INKJET PRINTER

(75) Inventors: Xuan-Chao Huang; Brant Dennis Nystrom, both of Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/248,816

(22) Filed: Feb. 11, 1999

(51) Int. Cl.[7] .............................. G06F 15/00; G03F 3/08; G06K 9/40
(52) U.S. Cl. ......................... 358/1.9; 358/520; 382/274
(58) Field of Search .................................. 358/1–9, 520, 358/504, 523, 527, 537, 518, 1.16, 1.17, 502; 382/162, 167, 255, 264, 274; 347/3, 24

(56) References Cited

U.S. PATENT DOCUMENTS

| | | | |
|---|---|---|---|
| 5,028,991 | * 7/1991 | Sekizawa et al. | 358/500 |
| 5,333,243 | * 7/1994 | Best et al. | 395/109 |
| 5,729,360 | * 3/1998 | Kita et al. | 358/500 |
| 5,861,896 | * 1/1999 | Barton et al. | 347/15 |
| 5,872,898 | * 2/1999 | Mhy | 395/109 |
| 5,881,210 | * 5/1999 | Guay et al. | 395/109 |
| 5,929,874 | * 7/1999 | Barton et al. | 347/15 |
| 5,987,168 | * 11/1999 | Decker et al. | 382/167 |
| 5,997,132 | * 12/1999 | Smith et al. | 347/43 |

FOREIGN PATENT DOCUMENTS

| | | | |
|---|---|---|---|
| 401168454A | * | 7/1989 | (JP) . |
| 408087104A | * | 4/1996 | (JP) . |
| 408137095 | * | 5/1996 | (JP) . |

* cited by examiner

Primary Examiner—Madeline Nguyen
(74) Attorney, Agent, or Firm—D. Brent Lambert (57) ABSTRACT

A device and method of determining an amount of ink to be used to print a color of a particular color lightness, chroma and hue in an inkjet printer in which the color lightness, chroma and hue are measured for a full ink wedge and a reduced ink wedge for a given color. The full ink wedge uses the maximum amount of ink for the given color and causes bleed through or smearing to occur and the reduced ink wedge uses less than the maximum amount of ink for the given color. A color difference between the reduced ink wedge and the full ink wedge is calculated. A vector distance between the reduced ink wedge and a white point in a three-dimensional colorant space is then calculated. Calibration points for each colorant or colorant combination in a three-dimensional colorant space are determined based on the vector distance, the color difference, and the predetermined color tolerance. A printer profile table is then generated using these new calibration points and downloaded to the printer. Printing using a reduced ink volume is then accomplished using the printer profile table.

28 Claims, 9 Drawing Sheets

| R | G | B | C | M | Y |
|---|---|---|---|---|---|
| 0 | 0 | 0 | 137 | 181 | 129 |
| 0 | 0 | 16 | 165 | 177 | 85 |
| ⋮ | ⋮ | ⋮ | ⋮ | ⋮ | ⋮ |
| 0 | 0 | 255 | 72 | 128 | 0 |
| 0 | 16 | 0 | 148 | 99 | 157 |
| 0 | 16 | 16 | 175 | 104 | 90 |
| ⋮ | ⋮ | ⋮ | ⋮ | ⋮ | ⋮ |
| 0 | 255 | 0 | 53 | 0 | 206 |
| 0 | 255 | 16 | 54 | 0 | 200 |
| ⋮ | ⋮ | ⋮ | ⋮ | ⋮ | ⋮ |
| 0 | 255 | 255 | 77 | 0 | 15 |
| 16 | 0 | 0 | 72 | 184 | 134 |
| 16 | 0 | 16 | 90 | 184 | 68 |
| ⋮ | ⋮ | ⋮ | ⋮ | ⋮ | ⋮ |
| 255 | 0 | 0 | 0 | 64 | 201 |
| 255 | 0 | 16 | 0 | 76 | 194 |
| ⋮ | ⋮ | ⋮ | ⋮ | ⋮ | ⋮ |
| 255 | 0 | 255 | 0 | 96 | 0 |
| 255 | 16 | 0 | 0 | 61 | 202 |
| 255 | 16 | 16 | 0 | 72 | 196 |
| ⋮ | ⋮ | ⋮ | ⋮ | ⋮ | ⋮ |
| 255 | 255 | 255 | 0 | 0 | 0 |

INK REDUCTION DEVICE AND METHOD FOR A COLOR INKJET PRINTER

BACKGROUND OF THE INVENTION

1. Field of the Invention

The present invention relates to a device and method to reduce the amount of ink used in a color inkjet printer. More particularly, the present invention relates to a device and method to reduce the amount of ink used in a color inkjet printer while maintaining a desired color lightness, chroma and hue value within a predetermined percentage deviation.

2. Description of the Related Art

In recent years color inkjet printers have been developed for home and office use. These printers have typically used three color inks comprising cyan, magenta, and yellow (hereinafter "CMY") color inks. In addition, a black (hereinafter "K") ink color is often used to form a four-color inkjet printer comprising cyan, magenta, yellow, and black (hereinafter "CMYK"). These color inkjet printers are suitable for generating reports, charts and graphs in color. However, several problems are frequently present in these printers caused by excessive ink usage. These problems include: ink smearing; ink bleed through; transfer of images to other sheets when stacked; high cost of printing color images; long drying times; and slow printing.

All of the above identified problems are related to the need to use large quantities of ink in order to create the more intense and darker color images. In the prior art, attempts have been made to resolve these problems by using faster drying inks and incorporating drying devices in the printers such as fans and heaters to more quickly dry the inks. However, these solutions have increased the cost of the printers by adding fans or heaters and have also increased the printing cost by using more expensive fast drying inks. Another solution employed has been to provide more time for the ink to dry by slowing the speed of printing. However, this is an unacceptable solution since users have grown accustomed to the speed of laser printers and are annoyed by the slow speed of printing using such a color inkjet printer. Further, this solution does not resolve the problem of bleed through seen in the prior art since the volume of ink used remains unchanged.

One of the reasons for these serious problems in the CMY or CMYK printing is that the substrate (especially plain paper) cannot absorb and sustain the volume of ink needed to create the more intense and dark color areas of an image. For example, the print medium in CMY printing may at most be able to accept 70% C, 70% M, and 70% Y ink being applied to the paper as the maximum amount of ink that can be applied. However, 70% maximum ink application of individual inks may not be enough for saturated cyan, magenta, or yellow color alone since the gamut or range of colors may be so reduced that a proper color image cannot be generated. In addition, it is not possible to simply reduce the amount of ink used uniformly throughout the entire color range of a color inkjet printer and achieve the same color lightness, chroma and hue desired.

Therefore, a need exits to reduce the volume of ink used in printing images and thereby eliminate the foregoing problems while at the same time maintaining the same color lightness, chroma and hue for the entire color range of the printer within an acceptable predetermined tolerance.

Figure 1:
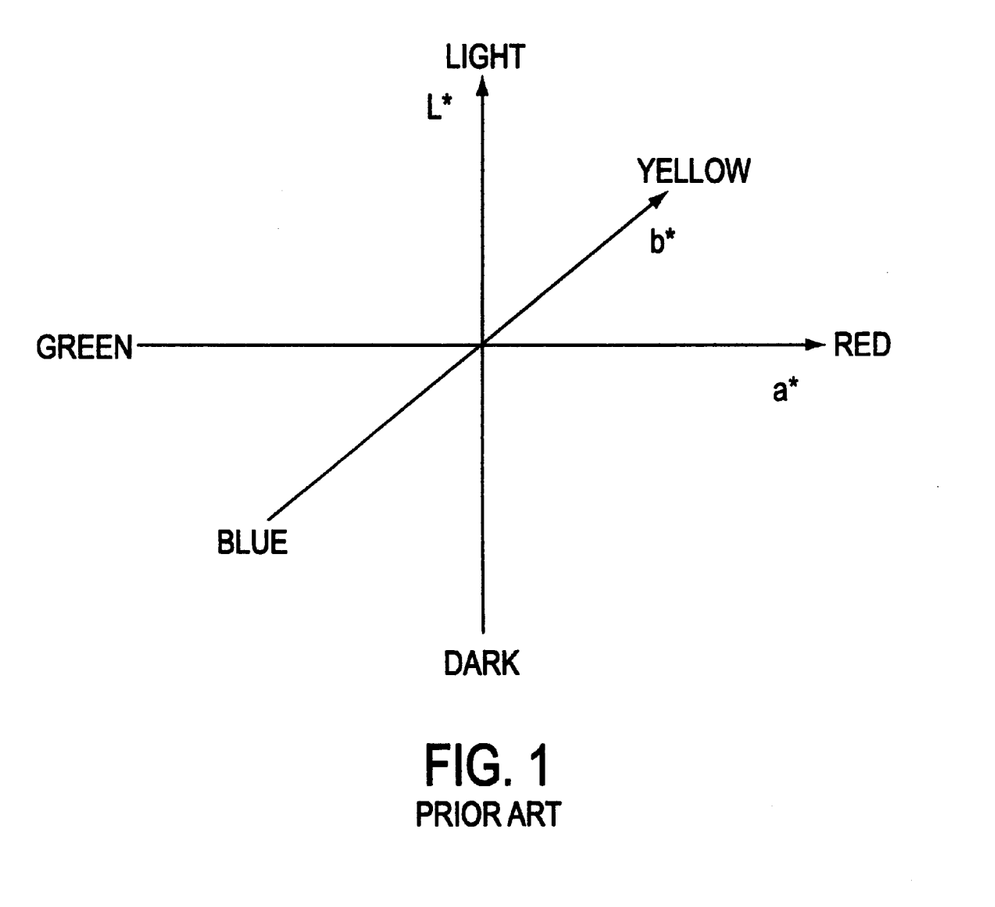
FIG. 1 is a diagram showing the CIELAB Cartesian coordinate system of the prior art.

The concept of color lightness, chroma and hue was established and defined in the CIELAB color system, which was established by the Commission Internationale de l'Eclairage (CIE) in 1976. The CIELAB system is a color space used in specifying color differences. It consists of three variables comprising L* (color lightness), a* (red-to-green), and b* (yellow-to-blue) forming Cartesian coordinates in a three-dimensional color space as shown in FIG. 1. The L* (hereinafter "color lightness") value represents a perceived lightness ranging from 0.0 for black to 100.0 for a diffuse white. The a* value dimension represents the red-green perceived color. The b* value dimension represents the yellow-blue perceived color. The a* and b* values range from negative to positive values. Their maximum values are limited by the physical properties of the materials employed including the inks and print medium. The color difference ($\Delta E^*_{ab}$) between two color points, ($L^*_1$, $a^*_1$, $b^*_1$) and ($L^*_2$, $a^*_2$, $b^*_2$), is defined by the distance between the two points and is computed by $$\Delta E^*_{ab} = [(L^*_2 - L^*_1)^2 + (a^*_2 - a^*_1)^2 + (b^*_2 - b^*_1)^2]^{1/2}$$

Figure 2:
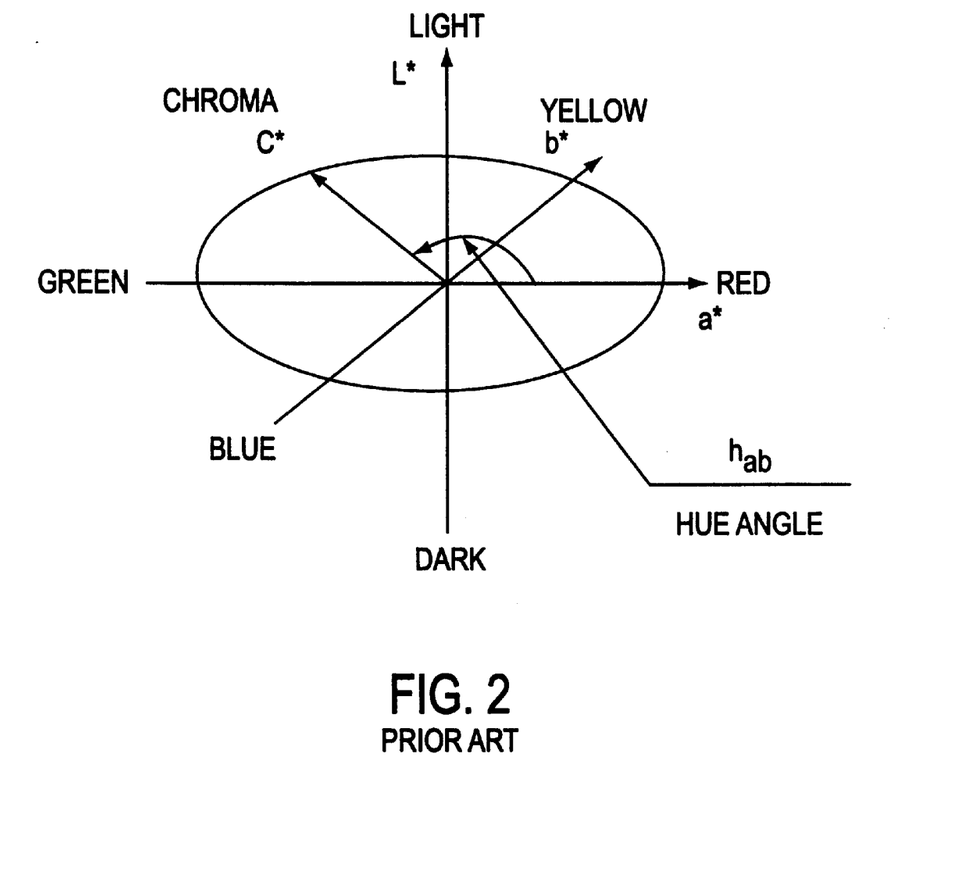
FIG. 2 is a diagram showing the CIELAB cylindrical coordinate system of the prior art.

This color space can also be represented by cylindrical coordinates as shown in FIG. 2. The cylindrical coordinate system provides predictors of chroma, $C^*_{ab}$, and hue, $h_{ab}$ as expressed by $$C^*_{ab} = [a^{*2} + b^{*2}]^{1/2}$$

and $$h_{ab} = \tan^{-1}(b^*/a^*).$$

In this instance, the chroma correlates the colorfulness of an area and the hue correlates the types of colors such as red, green, blue, yellow, etc.

Prior to the present invention, a technician would visually inspect dark color wedges produced by a printer through the range of intensities and reduce the ink levels until an acceptable level of color and bleed through are achieved. Unfortunately, this would not create consistent results from one technician to the next and it also took a great deal of time.

Therefore, a device and method is needed that will eliminate the problems created by the use of excessive amounts of ink while maintaining the same consistent color lightness, chroma and hue values or at least maintaining these values within an acceptable predetermined tolerance value.

SUMMARY OF THE INVENTION

An object of the present invention is to provide an efficient method to reduce the excess color ink placed on a substrate without impairing the visually distinguishable color range of the printer, or at the very least, maintain the color range reduction to within a predetermined tolerance for the color inkjet printer.

Objects and advantages of the present invention are achieved with the embodiments by a method of determining an amount of ink to be used to print a color of a particular color lightness, chroma and hue in a color inkjet printer. This method starts by measuring a color difference based on a color lightness, chroma and hue for a full ink wedge represented by a full ink peak point and a reduced ink wedge represented by a reduced ink peak point. The full ink wedge uses the maximum amount of ink for the color and causes bleed through or smearing to occur and the reduced ink wedge uses less than the maximum amount of ink for the color. A reduced ink peak point is then selected that has a color difference less than a predetermined color tolerance. Using these selected reduced ink peak points a printer profile is built.

In accordance with embodiments of the present invention, the method of determining an amount of ink to be used to print a color is accomplished by calculating the color difference between the reduced ink peak point and the full ink peak point based on a vector distance between each of the reduced ink peak points and the full ink peak points.

In accordance with further embodiments of the present invention, the method of determining an amount of ink to be used to print a color determines the vector distance by $\Delta E*_{ab} = [(L*_2 - L*_1)^2 + (a*_2 - a*_1)^2 + (b*_2 - b*_1)^2]^{1/2}$.

In accordance with further embodiments of the present invention, the method of determining an amount of ink to be used to print a color uses a plurality of full ink color wedges represented by a plurality of full ink peak points, and a plurality of reduced ink wedges represented by a reduced ink peak points. The color difference is one of a plurality of color differences associated with each the plurality of full ink peak points and the plurality of reduced ink peak points.

In accordance with still further embodiments of the present invention, the method of determining an amount of ink to be used to print a color determines a maximum permitted ink boundary in a three-dimensional colorant space by selecting reduced ink peak points that have a color difference less than the predetermined color tolerance.

In accordance with further embodiments of the present invention, the method of determining an amount of ink to be used to print a color also interpolates the maximum permitted ink boundary in the three-dimensional colorant space based on the selected reduced ink peak points.

In accordance with further embodiments of the present invention, the method of determining an amount of ink to be used to print a color by interpolating the maximum permitted ink boundary is determined by $$d_{vm} = (\Sigma w_i d_{ib})/(\Sigma w_i) \quad w_i = (1/a_i)^2$$

and $$a_i = \cos^{-1}[(V \cdot V_{ib})/(|V| \cdot |V_{ib}|)]$$

where $d_{vm}$=the maximum permitted distance of the vector (V) in consideration from the white point, i=index to the nearest four measured neighboring points, $d_{ib}$=the distance of the vector ($V_{ib}$) between the point at the maximum permitted ink boundary determined by the measurement and the white point, $w_i$=the average weight.

In accordance with further embodiments of the present invention, the method of determining an amount of ink to be used to print a color also selects a plurality of calibration points in the maximum permitted ink boundary.

In accordance with still further embodiments of the present invention, the method of determining an amount of ink to be used to print a color also modifies a calibration point of the plurality of calibration points that exceeds a maximum amount of ink permitted based on the reduced ink peak points.

In accordance with further embodiments of the present invention, the method of determining an amount of ink to be used to print a color by building a printer profile table based on the calibration points, and then printing a color image using the printer profile table.

Further objects and advantages of the present invention are achieved in accordance with embodiments by a device to determine an amount of ink to be used to print a color of a particular color lightness, chroma and hue in a color inkjet printer. This devices uses a color difference calculation module to determine a color difference based on a color lightness, chroma and hue for a full ink wedge represented by a full ink peak point and a reduced ink wedge represented by a reduced ink peak point. The full ink wedge uses the maximum amount of ink for the color and causes bleed through or smearing to occur and the reduced ink wedge uses less than the maximum amount of ink for the color. A boundary determination module selects the reduced ink peak point that has a color difference less than a predetermined color tolerance. A printer profile build module builds a printer profile based on the selected reduced ink peak points.

In accordance with further embodiments of the present invention, the color difference calculation module calculates the color difference between the reduced ink peak point and the full ink peak point based on a vector distance between each of the reduced ink peak points and the full ink peak points.

In accordance with still further embodiments of the present invention, the color difference calculation module determines the vector distance by $\Delta E*_{ab} = [(L*_2 - L*_1)^2 + (a*_2 - a*_1)^2 + (b*_2 - b*_1)^2]^{1/2}$.

In accordance with further embodiments of the present invention, the device to determine an amount of ink to be used to print a color uses a boundary determination module to determine a maximum permitted ink boundary in a three-dimensional colorant space by selecting reduced ink peak points that have a color difference less than the predetermined color tolerance.

In accordance with further embodiments of the present invention, the device to determine an amount of ink to be used to print a color employs an interpolation module to interpolate the maximum permitted ink boundary in the three-dimensional colorant space based on the selected reduced ink peak points.

In accordance with still further embodiments of the present invention, the interpolation module interpolates the maximum permitted ink boundary by $$d_{vm} = (\Sigma w_i d_{ib})/(\Sigma w_i) \quad w_i = (1/a_i)^2$$

$$a_i = \cos^{-1}[(V \cdot V_{ib})/(|V| \cdot |V_{ib}|)]$$

where $d_{vm}$=the maximum permitted distance of the vector (V) in consideration from the white point, i=index to the nearest four measured neighboring points, $d_{ib}$=the distance of the vector ($V_{ib}$) between the point at the maximum permitted ink boundary determined by the measurement and the white point, $w_i$=the average weight.

and

In accordance with further embodiments of the present invention, the device to determine an amount of ink to be used to print a color also has a calibration point examination module to select a plurality of calibration points in the maximum permitted ink boundary.

In accordance with further embodiments of the present invention, the device to determine an amount of ink to be used to print a color also uses a calibration point modification module to modify a calibration point of the plurality of calibration points that exceeds a maximum amount of ink permitted based on the reduced ink peak points.

In accordance with further embodiments of the present invention, the device to determine an amount of ink to be used to print a color employs a printer profile build module to build a printer profile table based on the calibration points. The color inkjet printer can then print a color image using the printer profile table.

Further objects and advantages of the present invention are achieved in accordance with the embodiments by a method of determining an amount of ink to be used to print a color of a particular color lightness, chroma and hue in an inkjet printer. This method prints full ink wedges for a plurality of full ink peak points using a plurality of ink colors, wherein the full ink wedges are printed using the maximum ink amount for each of the plurality of ink colors. Then reduces the amount of ink for each of the full ink peak points and printing a plurality of reduced ink wedges represented by reduced ink peak points selected along a vector line that connects the full ink peak points and a white point in a three-dimensional colorant space when bleed through or smearing is detected in a full ink wedge. It also measures a color lightness, chroma and hue for each of the full ink wedges to form a three-dimensional colorant space with full ink peak points and measures a color lightness, chroma and hue for each of the reduced ink wedges to form reduced ink peak points in the three-dimensional colorant space. Further this method calculates a color difference between each of the reduced ink peak points and each of the full ink peak points based on the color lightness, chroma and hue measured. It then selects reduced ink peak points in which the color difference is less than a predetermined color tolerance and forms a maximum permitted ink boundary. Finally, it determines a plurality of calibration points for each ink color in the three-dimensional colorant space based on the selected reduced ink peak points, and builds a printer profile table based on the plurality of calibration points.

Further objects and advantages of the present invention are achieved in accordance with the embodiments by a device to determine an amount of ink to be used to print a color of a particular color lightness, chroma and hue in an inkjet printer. This device uses a wedge printing module to print full ink wedges for a plurality of full ink peak points using a plurality of ink colors. These full ink wedges are printed using the maximum ink amount for each of the plurality of ink colors. A $N_2$ points selection module selects reduced ink peak points by reducing the amount of ink for each of the full ink peak points and print a plurality of reduced ink wedges represented by reduced ink peak points selected along a vector line that connects the full ink peak points and a white point in a three-dimensional colorant space when bleed through or smearing is detected in a full ink wedge. A color measurement unit is used to measure a color lightness, chroma and hue for each of the full ink wedges to form a three-dimensional colorant space with full ink peak points, and to measure a color lightness, chroma and hue for each of the reduced ink wedges to form reduced ink peak points in the three-dimensional colorant space. A color difference calculation module then calculates a color difference between each of the reduced ink peak points and each of the full ink peak points based on the color lightness, chroma and hue measured. A boundary determination module selects reduced ink peak points in which the color difference is less than a predetermined color tolerance and to form a maximum permitted ink boundary. A calibration point examination module determines a plurality of calibration points for each ink color in the three-dimensional colorant space based on the selected reduced ink peak points. A print profile build module to build a printer profile table based on the plurality of calibration points.

BRIEF DESCRIPTION OF THE DRAWINGS

These and other objects and advantages of the invention will become apparent and more readily appreciated for the following description of the preferred embodiments, taken in conjunction with the accompanying drawings.

DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

Since CMY printing only uses the cyan, magenta, and yellow inks to produce the darker colors whilst CMYK printing uses some quantity of black ink and less CMY inks to achieve the same effect, there exist more serious excessive ink problems in the CMY printing than in the CMYK printing. Therefore, this discussion will focus only on CMY printing. However, as would be appreciated by one of ordinary skill in the art, the principle and spirit of the following embodiments will apply for the printing process using CMYK inks or any number of different ink colors or combinations of ink colors.

Figure 4:
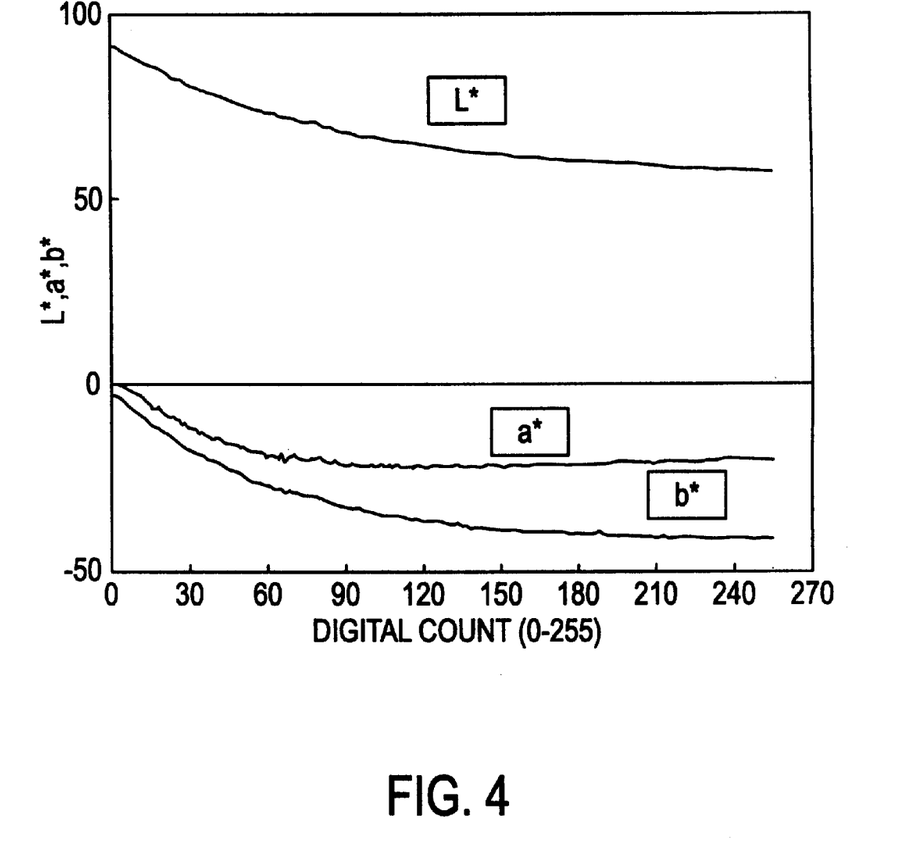
FIG. 4 is a chart used in the ink volume reduction method shown in FIG. 3 showing the change in $L^*$, $a^*$, and $b^*$ values versus the digital count of a given ink color.

There are two ink reduction requirements that are met by the embodiments of the present invention. The first requirement is to reduce ink volume used without reducing the visually distinguishable color range. As shown in FIG. 4, the reason for this requirement is that the color may not change significantly as the ink volume continues to increase when the ink volume reaches a certain amount. The second requirement is to reduce ink volume to within a predetermined color tolerance of the color lightness, chroma and hue values of the CIELAB system. These requirements are fulfilled by embodiments of the present invention as described below.

Figure 3:
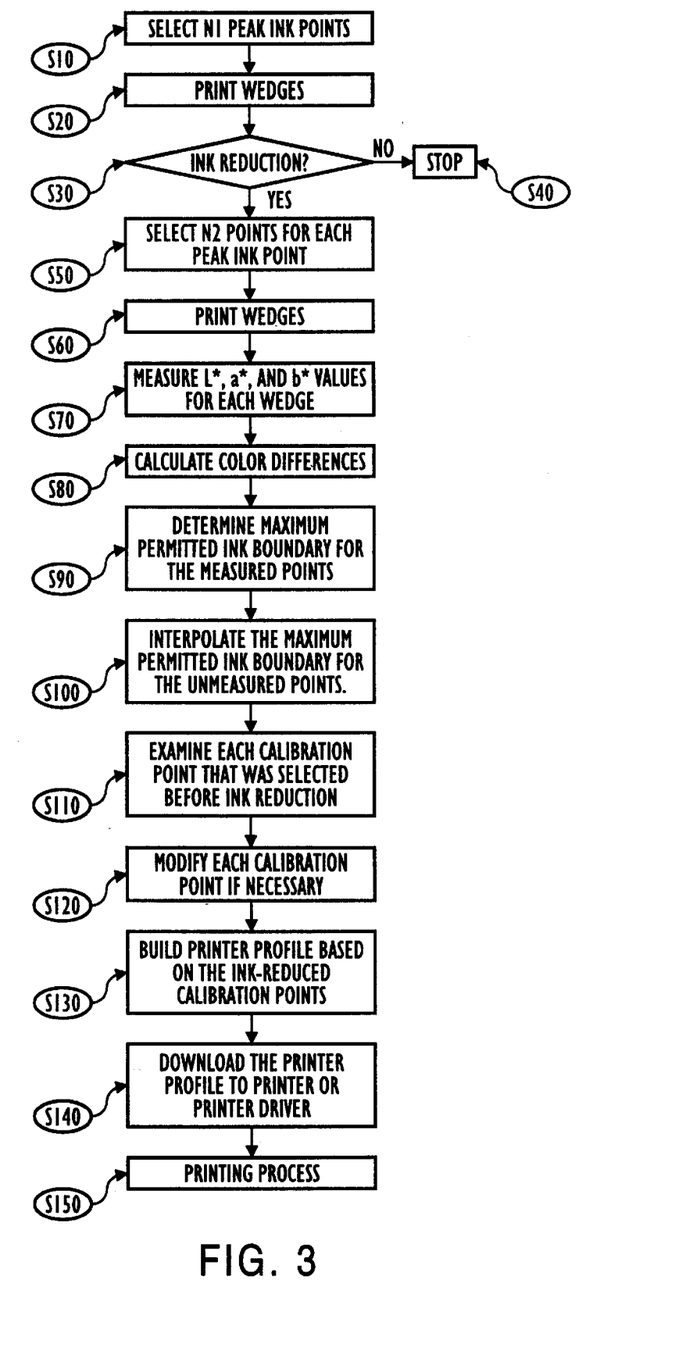
FIG. 3 is a flowchart of the method employed according to an embodiment of the present invention to reduce the volume of ink used to print a color image without either reducing the color lightness, chroma and hue, or at least maintaining these values to within a predetermined tolerance.
Figure 9:
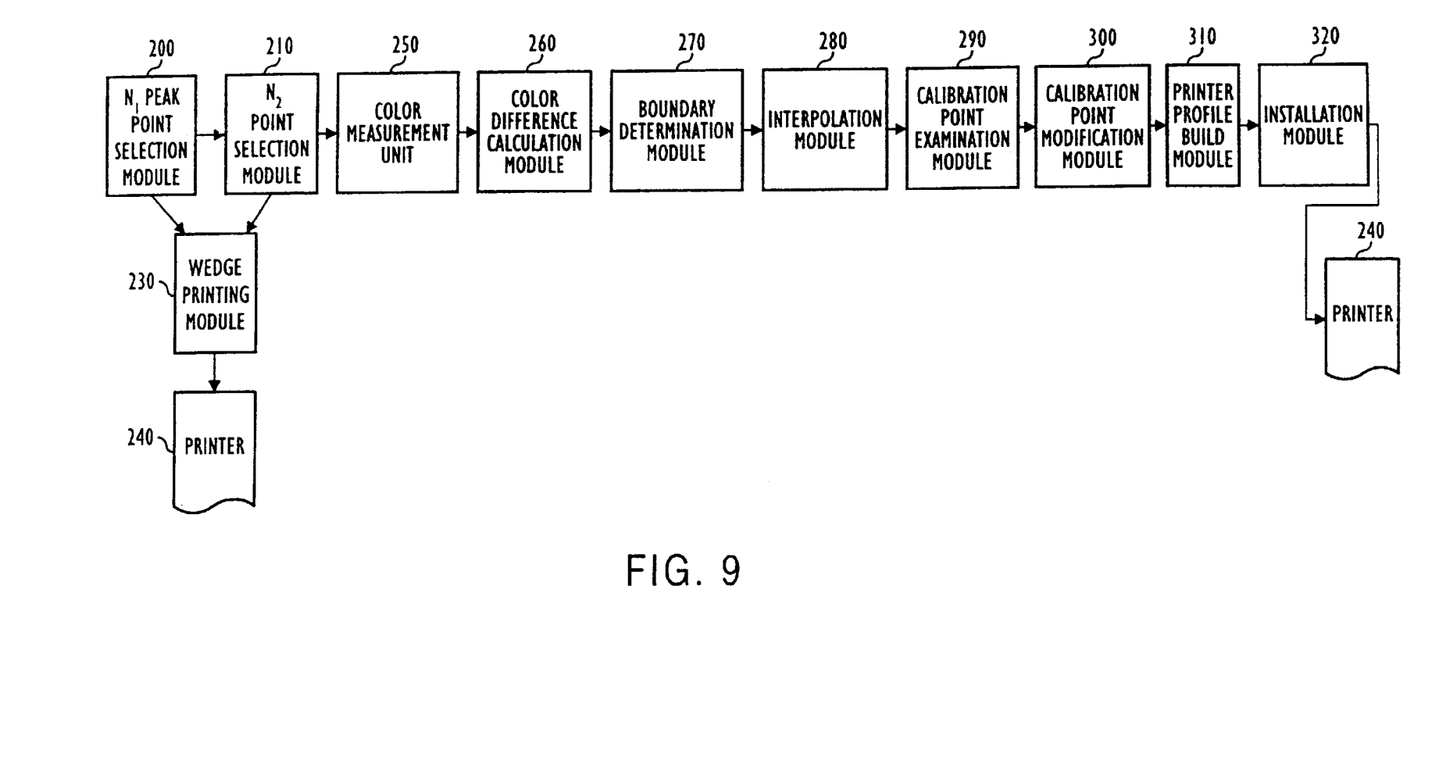
FIG. 9 is a block diagram showing the modular configuration of the flowchart as shown in FIG. 3 according to a preferred embodiment of the present invention.

FIG. 3 is a flowchart of the method employed according to an embodiment of the present invention to reduce the volume of ink used to print a color image without either reducing the color lightness, chroma and hue, or at least maintaining these values to within a predetermined tolerance. FIG. 9 is a block diagram showing the modular configuration of the flowchart as shown in FIG. 3 according to a preferred embodiment of the present invention. Both FIG. 3 and FIG. 9 will be discussed together in the embodiments of the present invention.

Selecting $N_1$ Peak Points

Figure 5:
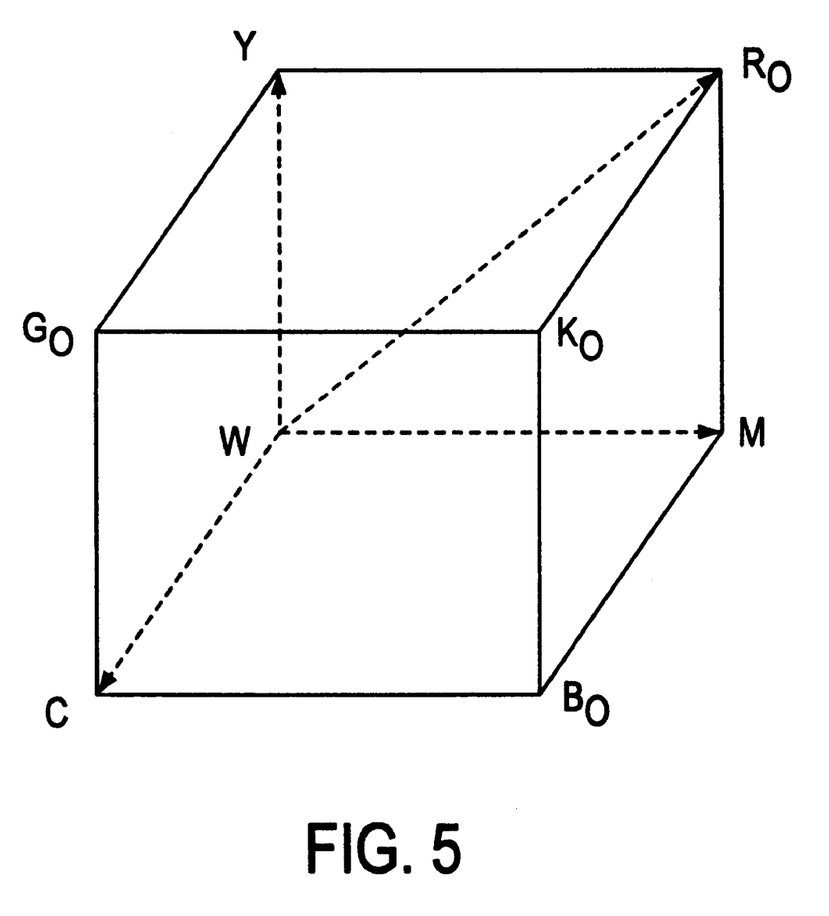
FIG. 5 is a chart used in the ink volume reduction method shown in FIG. 3 showing the peak colorant points in a three-dimensional colorant space.

As provided in step S10 of FIG. 3, $N_1$ peak points ($P_{i0}$, i=0, 1, 2, ..., $N_1$) representing ink amount in the colorant space are selected using a $N_1$ peak points selection module 200 shown in FIG. 9. In FIG. 5, a CMY colorant space where the C, M, and Y are the three inks—cyan, magenta, and yellow is shown. All the full ink combinations shown in FIG. 5 include the following:

(1) C(100%);
(2) M(100%);
(3) Y(100%);
(4) C+M, point $B_0$ (producing a near blue color) in FIG. 5;
(5) C+Y, point $G_0$ (producing a near green color) in FIG. 5;
(6) M+Y, point $R_0$ (producing a near red color) in FIG. 5; and
(7) C+M+Y, point $K_0$ (producing a near black color) in FIG. 5.

Thus, seven $N_1$ peak points are selected in this embodiment of the present invention.

Wedge Printing and Wedge Evaluation

As provided in step S20 of FIG. 3, wedges for all $N_1$ peak points selected are printed by a wedge printing module 230 on printer 240 shown in FIG. 9. These wedges represent full ink wedges for the $N_1$ peak points. Then in step S30 of FIG. 3, the printed wedges are examined visually. If no ink reduction is necessary due to no bleed through or smearing occurring, then the method of an embodiment of the present invention proceeds to step S40 of FIG. 3 and processing stops.

Selecting $N_2$ Points for Each Peak Point

As provided in step S50 of FIG. 3, $N_2$ points ($P_{ij}$, j=0, 1, 2, ..., $N_2$) for each of the $N_1$ peak point starting from the peak point (e.g. $R_0$ in FIG. 5) along with a vector are selected by the $N_2$ points selection module 210 shown in FIG. 9. The $N_2$ points are selected along with their respective vector that connects the peak point of the $N_1$ peak points and a white point W. As an example, the vector $WR_0$ shown in FIG. 5 originates at white point W and terminates at peak point $R_0$. These $N_2$ points represent a reduced volume of ink that approximates the color lightness, chroma and hue of the $N_1$ peak points.

Wedge Printing

As provided in step S60 of FIG. 3, wedges for all $N_2$ points selected are printed by the wedge printing module 230 on printer 240 shown in FIG. 9. These wedges represent reduced ink wedges for the $N_2$ points and should use such a reduced volume of ink that bleed through and smearing should not be seen.

Measure Color Lightness, Chroma and Hue

As provided in step S70 of FIG. 3, color values (L*, a*, b*) in the CIELAB system for each wedge are measured using the color measurement unit 250 shown in FIG. 9. The color measurement unit 250 may be a spectrophotometer such as the X-Rite spectrophotometer.

Calculate Color Difference

As provided in step S80 of FIG. 3, a color difference ($\Delta E^*_{ij}$) between the full-ink peak point ($P_{i0}$) and the reduced-ink point ($P_{ij}$) is calculated using the color difference calculation module 260 shown in FIG. 9. This is accomplished by determining a vector distance between the $N_1$ peak points and the $N_2$ points in the CIELAB space.

Determine Maximum Ink Boundary

As provided in step S90 of FIG. 3, a search for a point ($P_{ib}$) which meets the predefined color tolerance ($\Delta E^*_{max}$) is conducted by the boundary determination module 270 shown in FIG. 9. The magnitude of the color tolerance is determined based on the visually distinguishable color difference and the acceptable level of the bleed through or smearing. Generally, the higher value of $\Delta E^*_{max}$ the greater the ink reduction realized. The $N_1$ peak points ($P_{ib}$, i=0, 1, 2, ..., $N_1$) will then form a maximum permitted ink boundary in the three-dimensional colorant space.

Interpolate the Maximum Permitted Ink Boundary

Figure 6:
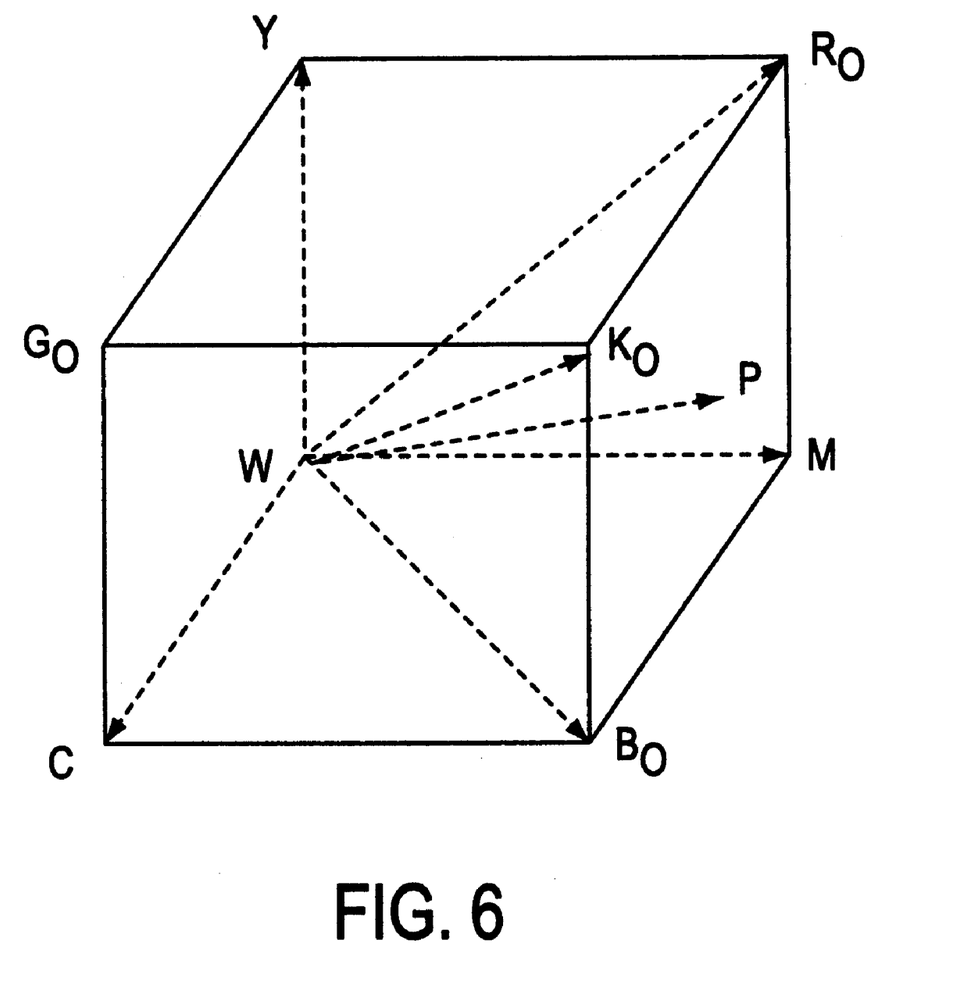
FIG. 6 is a chart used in the ink volume reduction method shown in FIG. 3 showing maximum permitted ink boundary interpolation in a three-dimensional colorant space.

As provided in step S100 of FIG. 3, the maximum permitted ink boundary interpolation for a given vector (from the white point to a given point) in the colorant space is determined by an interpolation module 280 shown in FIG. 9. The maximum permitted ink for a vector (V) is defined by the maximum permitted vector distance ($d_{vm}$) from the white point (shown in FIG. 6), and is computed by an inverse angle interpolation formula (Equation 1) using the nearest four measured neighboring points to the given point, as provided below.

$$d_{vm} = (\Sigma w_i d_{ib})/(\Sigma w_i) \quad w_i = (1/a_i)^2 \qquad \text{Equation 1}$$

and $$a_i = \cos^{-1}[(V \cdot V_{ib})/(|V| \cdot |V_{ib}|)]$$

The symbols in the above equations are defined as follows:

(1) $d_{vm}$=the maximum permitted distance of the vector (V) in consideration from the white point.
(2) i=index to the nearest four measured neighboring points, i=0, 1, 2, 3.
(3) $d_{ib}$=the distance of the vector ($V_{ib}$) between the point at the maximum permitted ink boundary determined by the measurement and the white point.
(4) $w_i$=the average weight.
(5) $\alpha$=the angle between the vector (V) in consideration and the measured vector ($V_{ib}$).

If the angle ($\alpha_i$) between the vector (V) and a measured neighboring point vector ($V_{ib}$) is zero, the vector is the same as the measured vector and the known value is assigned to the vector.

Examination of Calibration Points

As provided in step S110 of FIG. 3, an examination of each calibration point in the colorant space is conducted by the calibration point modification module 290. When building a printer profile, it is necessary to select several calibration points in the colorant space in order to calibrate each printer. As would be appreciated by one of ordinary skill in the art, the number of calibration points selected depends on the accuracy desired.

Figure 7:
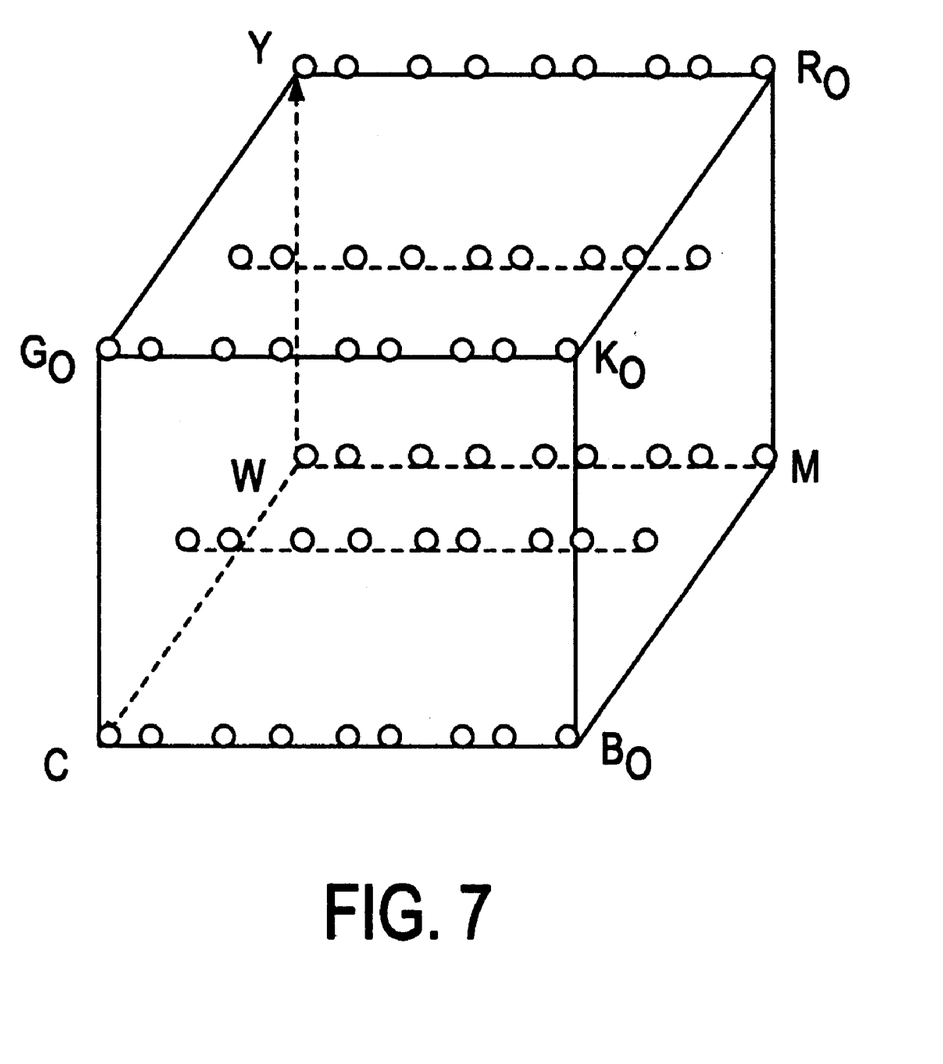
FIG. 7 is a chart used in the ink volume reduction method shown in FIG. 3 showing a sampling of original calibration points (before ink reduction) in a three-dimensional colorant space of FIG. 6.

FIG. 7 shows several such calibration points sampled in the colorant space. For CMY printing, each calibration point will contain a combination of the three ink digital counts ($C_0$, $M_0$, $Y_0$). For each calibration point, a maximum permitted distance ($d_{vm}$) using Equation 1 is calculated. Then a distance (d) from the white point to the calibration point is calculated using Equation 2.

$$d = (I_0^2 + I_1^2 + \ldots + I_n^2)^{1/2} \qquad \text{Equation 2}$$

where $I_i$ is the original ith ink digital count of the point. For CMY printing, i=0, 1, 2; $I_0=C_0$, $I_1=M_0$, and $I_2=Y_0$.

Modification of Calibration Points

As provided in step S120 of FIG. 3, modification of a calibration point in the colorant space is carried out when necessary by the calibration point modification module 300 shown in FIG. 9. If $d>d_{vm}$, the calibration point should be modified according to Equation 3 since more ink than desired is used. Where d is less than or equal to $d_{vm}$ then the calibration point is not modified.

$$I_{0i}=(d_{vm}/d)\cdot I_i \quad \text{Equation 3}$$

where $I_{0i}$ is the modified ith ink digital count. The above calculation using Equation 3 will ensure that the new point ink distance ($d_{new}$) is not greater than the permitted distance since $$d_{new}=(I_{00}^2+I_{01}^2+\ldots+I_{0n}^2)^{1/2}=(d_{vm}/d)\cdot(I_0^2+I_1^2+\ldots+I_n^2)^{1/2}=d_{vm}.$$

When printing wedges for calibration and conducting inverse transformation (within the range map) from color space to colorant space, the above modified point matrix is used.

This ink reduction method will ensure that the created printer profile table will remove excess inks for each color point without impairing the visually distinguishable color range when the predetermined color tolerance ($\Delta E^*_{max}$) is less than the value 3. It has been determined that for most people with average vision maintaining the predefined color tolerance $\Delta E^*_{max}$ to less than 3 produces a nearly imperceptible color difference. However, as would be appreciated by a person of ordinary skill in the art, the smaller the $\Delta E^*_{max}$ the less perceptible the change is. This predetermined color tolerance $\Delta E^*_{max}$ must also remain within the range reduction tolerance for inkjet printing.

Build Printer Profile Table and Install

Figure 8:
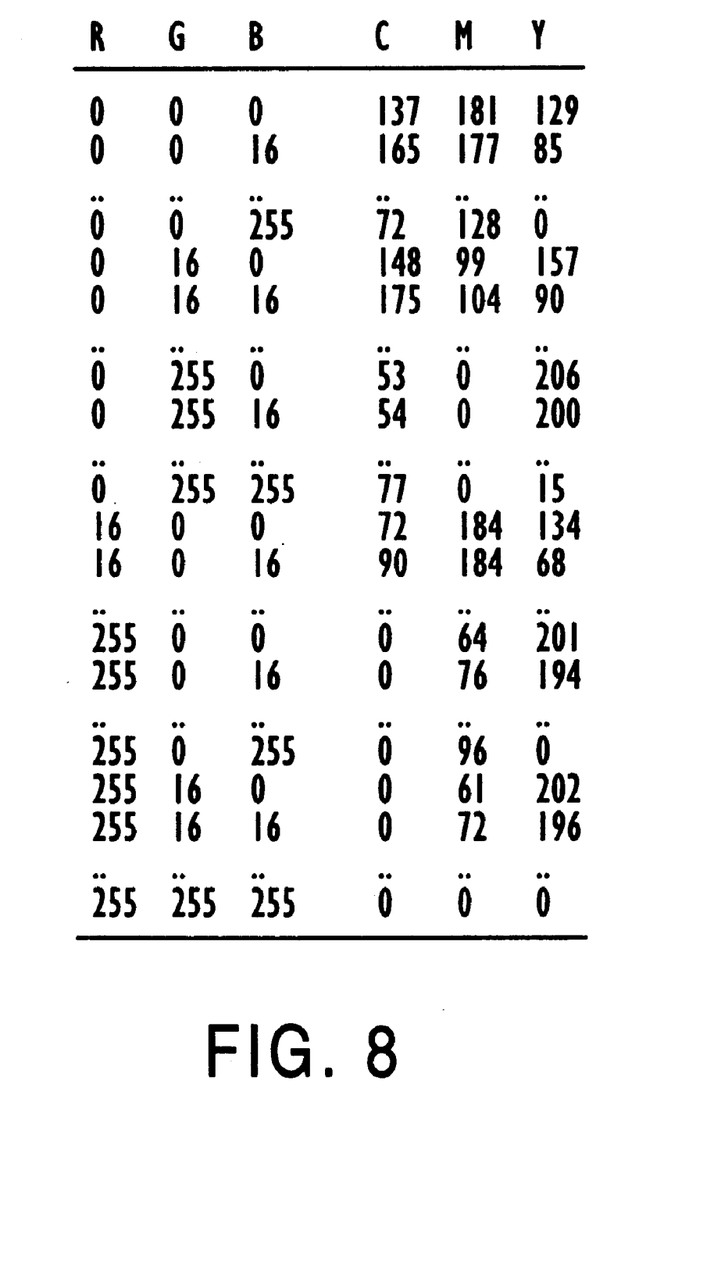
FIG. 8 is a three variable to three variable three-dimensional table showing an example of a printer profile table generated by the ink volume reduction method shown in FIG. 3.

As provided in step S130 of FIG. 3, the printer profile table, shown in FIG. 8, is created by the printer profile build module 310 shown in FIG. 9. The printer profile table is then downloaded to the printer or printer driver in step S140 of FIG. 3 by the installation module 320 shown in FIG. 9. Once installed the printer profile table may be used in printing provided in step S150, shown in FIG. 3, by printer 240 shown in FIG. 9.

As would be appreciated by one of ordinary skill in the art, the foregoing tables may be physically located in volatile or nonvolatile memory or in a mass storage device such as a disk drive located either in a computer or in the color inkjet printer. Also, the foregoing tables may be included in EPROM or ROM provided in the color inkjet printer.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A method of determining an amount of ink to be used to print a-color of a particular color lightness, chroma and hue in a color inkjet printer, comprising:
   measuring a color difference based on a color lightness, chroma and hue for a full ink wedge represented by a full ink peak point and a reduced ink wedge represented by a reduced ink peak point, wherein the full ink wedge uses the maximum amount of ink for the color and causes bleed through or smearing to occur and the reduced ink wedge uses less than the maximum amount of ink for the color;
   selecting the reduced ink peak point that has a color difference, compared to the full ink peak point, less than a predetermined color tolerance; and
   building a printer profile based on the selected reduced ink peak point.

2. A method of determining an amount of ink to be used to print a color as recited in claim 1, wherein the calculating of the color difference between the reduced ink peak point and the full ink peak point is based on a vector distance between the reduced ink peak point and the full ink peak point in a CIELAB space.

3. A method of determining an amount of ink to be used to print a color as recited in claim 2, wherein the vector distance is determined by $$\Delta E^*_{ab}=[(L^*_2-L^*_1)^2+(a^*_2-a^*_1)^2+(b^*_2-b^*_1)^2]^{1/2}$$

where $\Delta E^*_{ab}$ is the color difference between two color points, $(L^*_1, a^*_1, b^*_1)$ and $(L^*_2, a^*_2, b^*_2)$, $L^*$=color lightness, $a^*$=red-to-green, and $b^*$=yellow-to-blue.

4. A method of determining an amount of ink to be used to print a color as recited in claim 1, wherein the full ink color wedge is one of a plurality of full ink color wedges represented by a plurality of full ink peak points, the reduced ink color wedge is one of a plurality of reduced ink wedges represented by a reduced ink peak points, and the color difference is one of a plurality of color differences associated with each of the plurality of full ink peak points and the plurality of reduced ink peak points.

5. A method of determining an amount of ink to be used to print a color as recited in claim 4, wherein building a printer profile further comprises:
   determining a maximum permitted ink boundary in a three-dimensional colorant space by selecting reduced ink peak points that have a color difference less than the predetermined color tolerance.

6. A method of determining an amount of ink to be used to print a color as recited in claim 5, further comprising:
   interpolating the maximum permitted ink boundary in the three-dimensional colorant space based on the selected reduced ink peak points.

7. A method of determining an amount of ink to be used to print a color as recited in claim 6, wherein interpolating the maximum permitted ink boundary is determined by $$d_{vm}=(\Sigma w_i d_{ib})/(\Sigma w_i) \quad w_i=(1/a_i)^2$$

$$a_i=\cos^{-1}[(V\cdot V_{ib})/(|\cdot|v_{ib}|)]$$

where $d_{vm}$=the maximum permitted distance of the vector (V) in consideration from the white point, i=index to the nearest four measured neighboring points, $d_{ib}$=the distance of the vector ($V_{ib}$) between the point at the maximum permitted ink boundary determined by the measurement and the white point, $\alpha_i$=the angle between the vector (V) in consideration and the measured vector ($V_{ib}$), and $w_i$=the average weight.

8. A method of determining an amount of ink to be used to print a color as recited in claim 5, further comprising:
   selecting a plurality of calibration points in the maximum permitted ink boundary.

9. A method of determining an amount of ink to be used to print a color as recited in claim 8, further comprising:
   modifying a calibration point of the plurality of calibration points that exceeds a maximum amount of ink permitted based on the reduced ink peak points.

10. A method of determining an amount of ink to be used to print a color as recited in claim 9, further comprising:
    building a printer profile table based on the calibration points; and
    printing a color image using the printer profile table.

11. A device to determine an amount of ink to be used to print a color of a particular color lightness, chroma and hue in a color inkjet printer, comprising:

color difference calculation module to determine a color difference based on a color lightness, chroma and hue for a full ink wedge represented by a full ink peak point and a reduced ink wedge represented by a reduced ink peak point, wherein the full ink wedge uses the maximum amount of ink for the color and causes bleed through or smearing to occur and the reduced ink wedge uses less than the maximum amount of ink for the color;

boundary determination module to select the reduced ink peak point that has a color difference, compared to the full ink peak point, less than a predetermined color tolerance; and printer profile build module to build a printer profile based on the selected reduced ink peak point.

12. A device to determine an amount of ink to be used to print a color as recited in claim 11, wherein the color difference calculation module calculates the color difference between the reduced ink peak point and the full ink peak point based on a vector distance between each of the reduced ink peak point and the full ink peak point in a CIELAB space.

13. A device to determine an amount of ink to be used to print a color as recited in claim 12, wherein color difference calculation module determines the vector distance by $$\Delta E^*_{ab} = [(L^*_2 - L^*_1)^2 + (a^*_2 - a^*_1)^2 + (b^*_2 - b^*_1)^2]^{1/2}$$

where $\Delta E^*_{ab}$ is the color difference between two color points, $(L^*_1, a^*_1, b^*_1)$ and $(L^*_2, a^*_2, b^*_2)$, $L^*$=color lightness, $a^*$=red-to-green, and $b^*$=yellow-to-blue.

14. A device to determine an amount of ink to be used to print a color as recited in claim 11, wherein the full ink color wedge is one of a plurality of full ink color wedges represented by a plurality of full ink peak points, the reduced ink color wedge is one of a plurality of reduced ink wedges represented by a reduced ink peak points, and the color difference is one of a plurality of color differences associated with each of the plurality of full ink peak points and the plurality of reduced ink peak points.

15. A device to determine an amount of ink to be used to print a color as recited in claim 14, further comprising:

boundary determination module to determine a maximum permitted ink boundary in a three-dimensional colorant space by selecting reduced ink peak points that have a color difference less than the predetermined color tolerance.

16. A device to determine an amount of ink to be used to print a color as recited in claim 15, further comprising:

interpolation module to interpolate the maximum permitted ink boundary in the three-dimensional colorant space based on the selected reduced ink peak points.

17. A device to determine an amount of ink to be used to print a color as recited in claim 16, wherein the interpolation module interpolates the maximum permitted ink boundary by $$d_{vm} = (\Sigma w_i d_{ib})/\Sigma w_i) \quad w_i = (1/a_i)^2$$

$$a_{i-cos}^{-1}[(V \cdot V_{ib})/(|V| \cdot |V_{ib}|)]$$

where $d_{vm}$=the maximum permitted distance of the vector (V) in consideration from the white point, i=index to the nearest four measured neighboring points, $d_{ib}$=the distance of the vector $(V_{ib})$ between the point at the maximum permitted ink boundary determined by the measurement and the white point, $a_i$=the angle between the vector (V) in consideration and the measured vector $(V_{ib})$, and $w_i$=the average weight.

18. A device to determine an amount of ink to be used to print a color as recited in claim 15, further comprising:

calibration point examination module to select a plurality of calibration points in the maximum permitted ink boundary.

19. A device to determine an amount of ink to be used to print a color as recited in claim 18, further comprising:

calibration point modification module to modify a calibration point of the plurality of calibration points that exceeds a maximum amount of ink permitted based on the reduced ink peak points.

20. A device to determine an amount of ink to be used to print a color as recited in claim 19, further comprising:

printer profile build module to build a printer profile table based on the calibration points; and print mechanism to print a color image using the printer profile table.

21. A method of determining an amount of ink to be used to print a color of a particular color lightness, chroma and hue in an inkjet printer, comprising:

printing full ink wedges for a plurality of full ink peak points using a plurality of ink colors, wherein the full ink wedges are printed using the maximum ink amount for each of the plurality of ink colors;

reducing the amount of ink for each of the full ink peak points and printing a plurality of reduced ink wedges represented by reduced ink peak points selected along a vector line that connects the full ink peak points and a white point in a three-dimensional colorant space when bleed through or smearing is detected in a full ink wedge;

measuring a color lightness, chroma and hue for each of the full ink wedges to form a three-dimensional colorant space with full ink peak points;

measuring a color lightness, chroma and hue for each of the reduced ink wedges to form reduced ink peak points in the three-dimensional colorant space;

calculating a color difference between each of the reduced ink peak points and each of the full ink peak points based on the color lightness, chroma and hue measured;

selecting reduced ink peak points in which the color difference is less than a predetermined color tolerance and to form a maximum permitted ink boundary;

determining a plurality of calibration points for each ink color in the three-dimensional colorant space based on the selected reduced ink peak points; and building a printer profile table based on the plurality of calibration points.

22. A method of determining an amount of ink to be used to print a color as recited in claim 21, further comprising:

interpolating the maximum permitted ink boundary for all points in the three-dimensional colorant space based on the selected reduced ink peak points.

23. A method of determining an amount of ink to be used to print a color as recited in claim 21, wherein the calculating of the color difference between the reduced ink peak point and the full ink peak point is based on a vector distance between each of the reduced ink peak points and the full ink peak points in the CIELAB space.

24. A device to determine an amount of ink to be used to print a color of a particular color lightness, chroma and hue in an inkjet printer, comprising:

wedge printing module to print full ink wedges for a plurality of full ink peak points using a plurality of ink colors, wherein the full ink wedges are printed using the maximum ink amount for each of the plurality of ink colors;

$N_2$ points selection module to select reduced ink peak points by reducing the amount of ink for each of the full ink peak points and print a plurality of reduced ink wedges represented by reduced ink peak points selected along a vector line that connects the full ink peak points and a white point in a three-dimensional colorant space when bleed through or smearing is detected in a full ink wedge;

color measurement unit to measure a color lightness, chroma and hue for each of the full ink wedges to form a three-dimensional colorant space with full ink peak points, and to measure a color lightness, chroma and hue for each of the reduced ink wedges to form reduced ink peak points in the three-dimensional colorant space;

color difference calculation module to calculate a color difference between each of the reduced ink peak points and each of the full ink peak points based on the color lightness, chroma and hue measured;

boundary determination module to select reduced ink peak points in which the color difference is less than a predetermined color tolerance and to form a maximum permitted ink boundary;

calibration point examination module to determine a plurality of calibration points for each ink color in the three-dimensional colorant space based on the selected reduced ink peak points; and print profile build module to build a printer profile table based on the plurality of calibration points.

25. A device to determine an amount of ink to be used to print a color as recited in claim 24, further comprising:

interpolation module to interpolate the maximum permitted ink boundary for all points in the three-dimensional colorant space based the selected reduced ink peak points.

26. A device to determine an amount of ink to be used to print a color as recited in claim 24, wherein the color difference calculation module calculates the color difference between the reduced ink peak point and the full ink peak point based on a vector distance between each of the reduced ink peak points and the full ink peak points in a CIELAB space.

27. A method of determining an amount of ink to be used to print a color of a particular color lightness, chroma and hue in a color inkjet printer, comprising:

printing a plurality of full ink wedges of a plurality of full ink peak points using a plurality of color inks, wherein the plurality of full ink wedges are created using the maximum volume of ink per pixel in the color inkjet printer;

detecting whether bleed through or smearing occurs in the plurality of full ink wedges;

selecting a plurality of reduced ink peak points representing a reduced ink volume along a vector line that connects a full ink peak point and a white point in a three-dimensional colorant space when bleed through or smearing is detected in a full ink wedge;

printing a plurality of reduced ink wedges based on the reduced ink peak points;

measuring a color lightness, chroma and hue for each of the full ink wedges to form a three dimensional colorant space with full ink peak points;

measuring a color lightness, chroma and hue for each of the reduced ink wedges to form reduced ink peak points in the three dimensional colorant space;

calculating a color difference between each of the reduced ink peak points and each of the full ink peak points based on the color lightness, chroma and hue by determining a vector distance between each of the reduced ink peak points and the full ink peak points in a CIELAB space;

determining a maximum permitted ink boundary in the three-dimensional colorant space by selecting reduced ink peak points that have a color difference less than a predefined color tolerance;

interpolating the maximum permitted ink boundary in the three-dimensional colorant space based on the selected reduced ink peak points;

selecting a plurality of calibration points in the maximum permitted ink boundary;

building a printer profile table based on the calibration points; and printing a color image using the printer profile table.

28. A device to determine an amount of ink to be used to print a color of a particular color lightness, chroma and hue in a color inkjet printer, comprising:

$N_1$ peak point selection module to select a plurality of full ink peak points in a three-dimensional colorant space, wherein the plurality of full ink peak points represents the maximum amount of ink per pixel that may be printed in the color inkjet printer;

wedge printing module to print a plurality of full ink wedges of the plurality of full ink peak points using a plurality of color inks, wherein the plurality of full ink wedges cause bleed through or smearing to occur in the plurality of full ink wedges;

$N_2$ point selection module to select a plurality of reduced ink peak points representing a reduced ink volume along a vector line that connects a full ink peak point and a white point in a three-dimensional colorant space when bleed through or smearing is detected in a full ink wedge;

the wedge printing module to print a plurality of reduced ink wedges based on the plurality of reduced ink peak points;

color measurement unit to measure a color lightness, chroma and hue for each of the full ink wedges to form a three-dimensional colorant space with full ink peak points, and to measure a color lightness, chroma and hue for each of the reduced ink wedges to form reduced ink peak points in the three-dimensional colorant space;

color difference calculation module to calculate a color difference between each of the plurality of reduced ink peak points and each of the plurality of full ink peak points based on the color lightness, chroma and hue by determining a vector distance between each of the reduced ink peak points and the full ink peak points in a CIELAB space;

boundary determination module to determine a maximum permitted ink boundary in the three-dimensional colorant space by selecting reduced ink peak points that have a color difference less than a predetermined color tolerance;

interpolation module to interpolate a maximum permitted ink boundary in the three-dimensional colorant space based on the selected reduced ink peak points;

calibration point examination module to select a plurality of calibration points in the maximum permitted ink boundary;

printer profile build module to build a printer profile table based on the calibration points; and print mechanism to print a color image using the printer profile table.

* * * * *

UNITED STATES PATENT AND TRADEMARK OFFICE
CERTIFICATE OF CORRECTION

PATENT NO. : 6,233,061 B1  
DATED : May 15, 2001  
INVENTOR(S) : Xuan-Chao Huang et al.

Page 1 of 1

It is certified that error appears in the above-identified patent and that said Letters Patent is hereby corrected as shown below:

<u>Column 10, claim 7,</u>  
Line 41, replace "$d_{vm}=(\Sigma w_i d_{ib})/(\Sigma w_i)$  $w_i=(1/a_i)^2$  
$a_i = \cos^{-1}[(V \cdot V_{ib})/(|\cdot|v_{ib}|)]$"  
with -- $d_{vm} = (\Sigma w_i d_{ib})/(\Sigma w_i)$  
$w_i = (1/a_i)^2$  
$a_i = \cos^{-1}[V \cdot V_{ib})/(|V| \cdot |V_{ib}|)]$ --

<u>Column 11, claim 17,</u>  
Line 59, replace "$d_{vm}=(\Sigma w_i d_{ib})/(\Sigma w_i)$  $w_i=(1/a_i)^2$  
$a_{i=\cos}^{-1}[(V \cdot V_{ib})/(|V| \cdot |V_{ib}|)]$"  
with -- $d_{vm} = (\Sigma w_i d_{ib})/(\Sigma w_i)$  
$w_i = (1/a_i)^2$  
$a_i = \cos^{-1}[(V \cdot V_{ib})/(|V| \cdot |V_{ib}|)]$ --

Signed and Sealed this

Nineteenth Day of February, 2002

*Attest:*

*Attesting Officer*

JAMES E. ROGAN  
*Director of the United States Patent and Trademark Office*